United States Patent Office 3,175,479
Patented Mar. 30, 1965

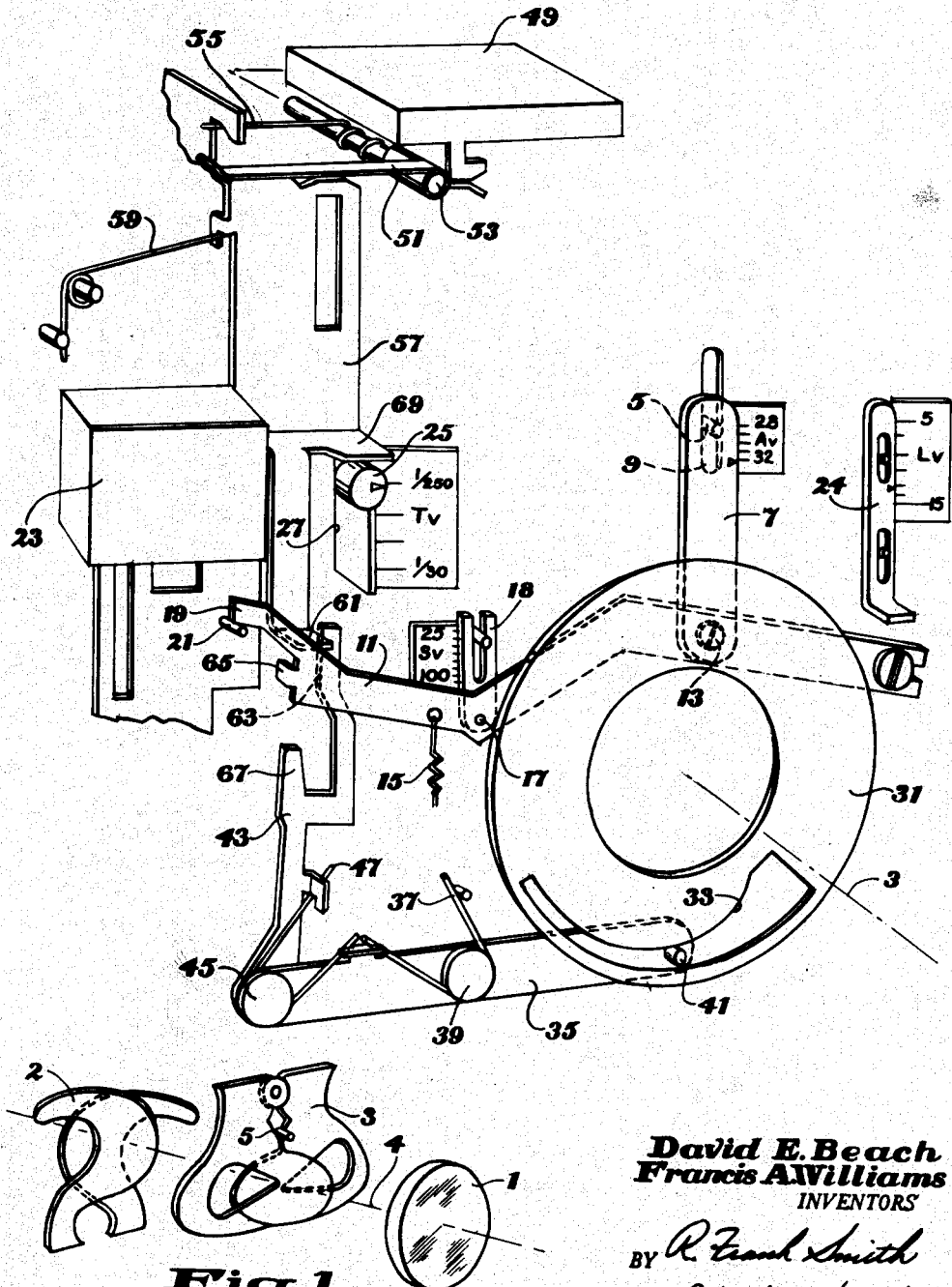

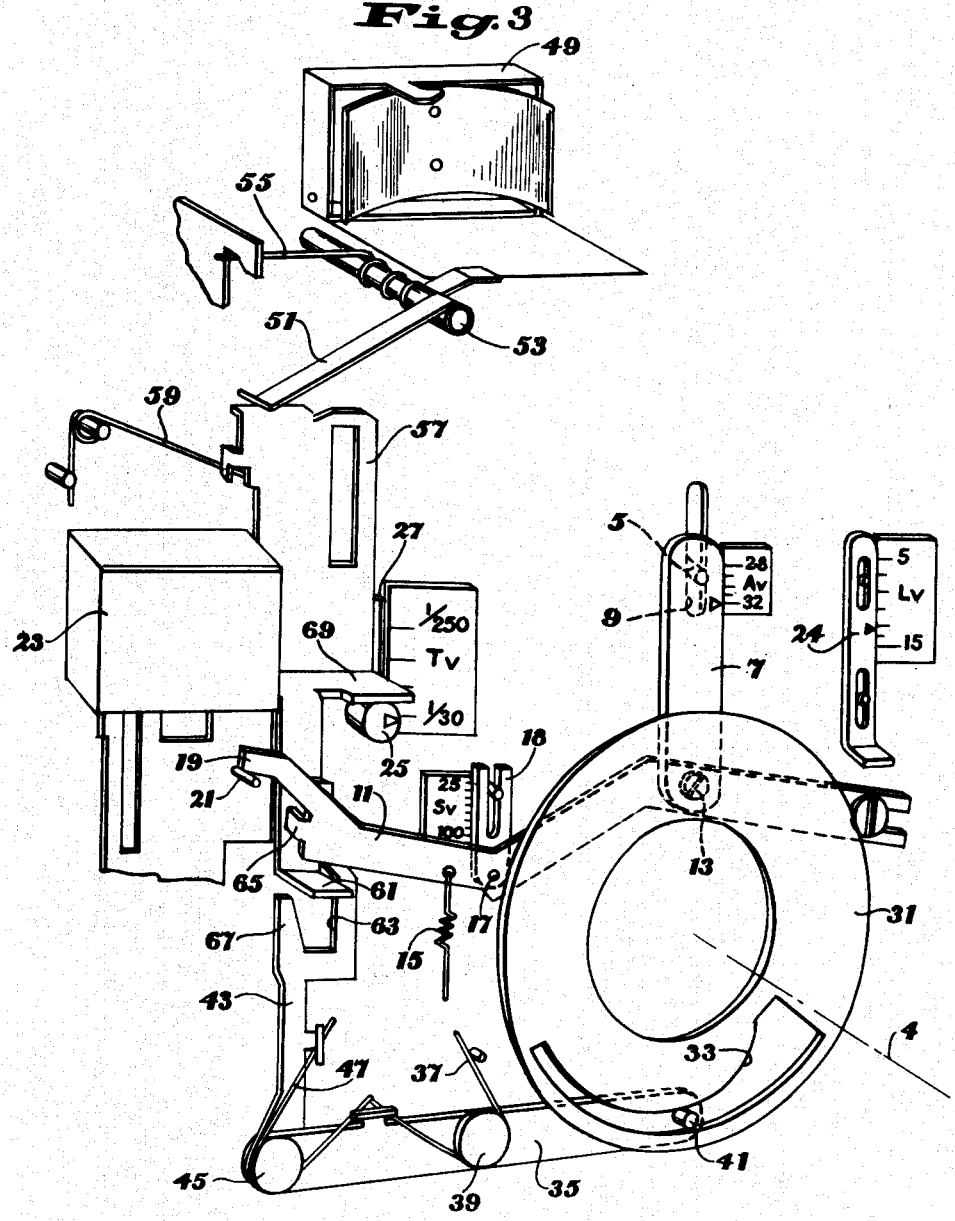

3,175,479
PHOTOGRAPHIC FLASH EXPOSURE CONTROL
David E. Beach and Francis A. Williams, Rochester, N.Y., assignors to Eastman Kodak Company, Rochester, N.Y., a corporation of New Jersey
Filed Feb. 28, 1963, Ser. No. 261,588
7 Claims. (Cl. 95—11)

This invention relates to photographic cameras and, more particularly, to cameras which can be readily adapted for either daylight or flash operation.

More prior art devices provide manual means for adjusting the camera's shutter means to a predetermined flash speed, while some others also provide manual means for selectively coupling the camera's focus ring with the diaphragm control mechanism of the camera so that the lens aperture may be automatically adjusted in accordance with the distance between a camera-mounted flash lamp and the subject.

The invention herein is an improvement on these devices and provides flash exposure control means which are made operational by a single, simple act by the camera operator, e.g., the opening of a door on the camera body to uncover the flash lamp holder or reflector. Once activated in this simple manner, the subject control means automatically selects a predetermined "flash" shutter speed and also provides the above-described coupling between the camera's diaphragm control and its focus adjusting means. In addition to the particular utility of the device in that it reduces the camera operator's preparation for flash lamp use to an obvious and uncomplicated act, it is also mechanically simple and readily lends itself to adaptation with automatic exposure control systems.

It is an object of this invention to provide a new and improved flash exposure control mechanism for photographic cameras.

Another object of this invention is to provide a flash exposure control mechanism that may be activated in a simple manner requiring no special physical coordination or mental calculation on the part of the operator.

A further object is to provide means in which a simple action, e.g., opening a covering for the camera's flash mechanism, will automatically set the camera's shutter means for a predetermined flash speed and at the same time couple the camera's diaphragm control with its focus adjusting means.

A still further object is to provide simple mechanical means that may be adapted to automatic daylight exposure control systems to assure accurate flash exposure control.

Other objects, purposes, and characteristic features of the present invention will be in part obvious from the accompanying drawings, and in part will be pointed out as the description of the invention progresses. In describing the invention in detail, reference will be made to the accompanying drawings in which like reference characters designate corresponding parts throughout both views, and in which:

FIG. 1 is a schematic diagram of the elements aligned on a camera's picture-taking axis;

FIG. 2 is a perspective view of the flash exposure control mechanism as it would appear mounted in a camera, showing the mechanism in its inoperative position in which it does not affect the camera's usual manual or automatic daylight exposure control system; and FIG. 3 illustrates the same elements shown in FIG. 1 with the flash exposure control mechanism in its operative condition overriding the camera's shutter control and interconnecting the camera's focus adjusting means with its diaphragm control.

As shown in FIG. 1, it is assumed that the mechanism herein is adapted to a camera which has its lens system 1, shutter 2, and variable diaphragm 3 mounted in a conventional manner along its picture-taking axis 4. Referring now to FIG. 2, the exposure control mechanism is shown in a simplified perspective in which all of the camera parts unessential to an understanding of the invention herein have been omitted. The variable aperture ($A_v$) of the camera's overlapping lens diaphragm elements is controlled by means of stud 5 which is staked to the back of diaphragm control member 7 and protrudes through slot 9 in the camera's mounting plate.

Diaphragm control member 7 is attached to exposure control bar 11 by means of pin 13. Control bar 11 is biased by spring 15 in a counterclockwise direction about adjustable pivot 17, which is secured to film compensation bar 18 and positioned in accordance with the sensitivity ($S_v$) of film being used in the camera. A finger 19 on exposure control bar 11 engages stud 21 which is integral with body release slide 23, and, since body release slide 23 is normally biased to the position shown by a spring of considerably greater force than spring 15, control bar 11 is normally held against the bias of spring 15 in the position shown, maintaining diaphragm control member 7 and its stud 5 in a position which provides the camera with its minimum lens diaphragm aperture.

When body release slide 23 is depressed by the camera operator, stud 21 moves away from fingers 19 and permits exposure control bar 11 to rotate counterclockwise under the bias of spring 15 until such time as the movement of control bar 11 is interrupted by a manually or automatically set light value ($L_v$) member 24, thereby stopping the movement of diaphragm control member 7 to provide the desired aperture for the exposure being taken.

Shutter speed ($T_v$) control stud 25, which protrudes through slot 27 in the camera's mounting plate, is integral with the camera's shutter-speed setting means which may be set either manually or automatically in any one of several ways known in the art. When stud 25 is in the position illustrated in FIG. 2, the shutter mechanism is set for its maximum speed, and, as the position of stud 25 moves downward in slot 27, the shutter-speed mechanism is controlled to progressively slower speeds, the minimum shutter speed being attained when stud 25 is moved to its lowest position within slot 27.

Rangefinder ring 31, which carries flash cam 33, is coupled to the focusing ring of the camera taking lens. Cam following lever arm 35 is biased in a counterclockwise direction about pivot 39 so that its stud 41 is held in constant engagement with cam 33. In this manner, lever arm 35 is positioned in accordance to the relation between stud 41 and cam 33 in response to the focusing of the camera taking lens.

Focus coupling lever 43 is pivotally attached to the end of cam following lever arm 35 by means of pin 45 and is biased in a counterclockwise direction about pin 45 by spring 47.

When the camera is being used for daylight photography, a flash reflector assembly 49 is normally latched down in the position illustrated in FIG. 2. When in this position, flash reflector assembly 49 presses down on the right-hand end of flash control lever 51, which is pivotally mounted on rod 53, and holds flash control lever 51 in the position shown against the force of spring 55. A flash control slide 57 is slidably mounted on the camera mounting plate and is biased upwardly by the force of control slide spring 59 which holds the upper edge of control slide 57 against the underside of flash control lever 51. Control slide 57 has a toe member 61 which abuts a cam surface 63 formed by the uppermost portion of focus coupling lever 43.

When the mechanism just described is in the position as illustrated in FIG. 2, the camera is properly conditioned for daylight photography, and when body release slide 23 is depressed by the camera operator, exposure control bar 11, which may be coupled to the shutter-speed control mechanism as well as the diaphragm control mechanism in cameras utilizing automatic exposure control, moves in a counterclockwise direction about adjustable pivot 17 until its motion is arrested by light value member 24 which is set manually, or, in the case of a fully automatic system, is set by a movable element in the camera's photo-responsive means which is positioned as a function of scene brightness. Under these conditions, lug 65, which is attached to exposure control bar 11, passes to the outside (to the left) of extension member 67 of focus coupling lever 43, thereby assuring proper relative setting of the diaphragm aperture and/or the shutter speed as determined by the position exposure control bar 11 attains at the time it is blocked by the manual or automatic light value member 24. Regardless of the movement of the focus coupling mechanism in response to the focusing of the camera lens, it does not affect the camera's daylight exposure control system, since any vertical movement of focus coupling lever 43 is not sufficient to move toe member 61 of flash control slide 57 out of engaging relation with the flat upper surface of cam 63 of focus coupling lever 43.

Referring now to FIG. 3, when the camera operator unlatches flash reflector assembly 49 in preparation for taking flash pictures, the force of control lever spring 55, which is greater than the force of control slide spring 59, causes flash control lever 51 to rotate about rod 53 in a counterclockwise direction as shown. This drives flash control slide 57 downwardly to the position illustrated in FIG. 3. The downward movement of control slide 57 moves its toe member 61 to the intended portion of cam surface 63 of focus coupling member 43, permitting focus coupling lever 43 to be moved counterclockwise (to the left) about pin 45 under the influence of spring 47 to the position shown in FIG. 3. In this position, extension member 67 of focus coupling lever 43 is directly in the path of lug 65 of exposure control bar 11.

At the same time, the downward movement of flash control slide 57 brings its hip member 69 into engagement with shutter speed control stud 25 and drives stud 25 downwardly in slot 27 to the position shown, thereby setting the camera's shutter mechanism for its slowest speed.

The camera is now ready for flash operation and, when the operator depresses body release slide 23, exposure control bar 11 moves counterclockwise about adjustable pivot 17 until its lug 65 contacts the upper surface of extension member 67. Since the relative vertical position of pivot 17 is determined by the sensitivity of the film, and since the relative vertical position of the upper surface of extension 67 is controlled by the setting of rangefinder ring 31 in response to the focusing of the camera lens, the correct camera aperture is selected as a function of film sensitivity and of the distance between the camera flash lamp and the subject. It is assumed, of course, that the camera disclosed herein is designed for use with a particular type of flash lamp, but it should be apparent that the coupling between rangefinder ring 31 and the camera's focus adjusting means may be made adjustable to permit utilization of various types of flash lamps.

It can be seen that according to the just described invention, the only preparation required of the camera operator prior to flash operation is that of opening flash reflector assembly 49, and the mechanism disclosed herein transmutes this simple act to set automatically the shutter-speed control mechanism to its "flash" value and to interrelate the diaphragm control mechanism with the focus adjusting means of the camera.

Although only one specific, simplified embodiment of the present invention is disclosed herein, it should be understood that this particular form has been selected to facilitate explanation of the invention rather than limit the number of forms which it may assume. Further, it should be understood that various modifications, alterations and adaptations may be applied to the specific form disclosed to meet the requirements of practice without in any manner departing from the spirit or scope of the present invention.

We claim:
1. In a camera having actuatable shutter means including a shutter and a movable control member for adjusting said shutter through a range of exposure times; diaphragm means including a lens diaphragm and a movable control member for adjusting said lens diaphragm through a range of effective apertures; a flash lamp mechanism including a flash operation conditioning element movable between a first position disabling said mechanism and a second position enabling said flash lamp mechanism to function in response to the actuation of said shutter means, and focus adjusting means, the improvement comprising: means responsive to the movement of said flash operation conditioning element to its second position, for (a) coupling said diaphragm control member to said focus adjusting means to adjust the aperture of said lens diaphragm in accordance with the position of said focus adjusting means and (b) for regulating the movement of said shutter control member to adjust the exposure time of said shutter to a predetermined value.

2. A camera according to claim 1 wherein said movable flash operation conditioning element is a cover member movable into and out of covering relation with a portion of said flash lamp mechanism.

3. In a camera having
an automatic exposure regulating mechanism including
shutter means with a shutter and a movable control member for adjusting said shutter through a range of speeds,
diaphragm means including a lens diaphragm and a movable control member for adjusting said lens diaphragm through a range of effective apertures, photoresponsive means including a member positionable as a function of scene brightness,
coupling means responsive to the position of said positionable member and interconnecting said shutter and diaphragm control means for varying the speed of said shutter and adjusting said lens diaphragm in accordance with scene brightness,
a flash lamp mechanism including an element movable between a position disabling said mechanism and an operative position enabling said flash lamp mechanism to function in response to the activation of said shutter means, and
focus adjusting means,
the improvement comprising:
flash operation control means responsive to the movement of said flash lamp element to its operative position for moving said shutter control member to adjust the speed of said shutter to a predetermined value, and for
interrelating said focus adjusting means and said coupling means to vary the aperture of said lens diaphragm as a function of the position of said focus adjusting means.

4. A camera according to claim 3 wherein said flash lamp element is a member movable into and out of covering relation to a portion of said flash lamp mechanism.

5. A camera according to claim 3 wherein said focus adjusting means includes a cam movable therewith and a lever mechanism responsive to the position of said cam, and wherein said flash operation control means causes said lever mechanism to limit the movement of said coupling means.

6. A camera according to claim 5 wherein said lever mechanism includes a movable flash coupling lever positioned in response to the movement of said cam and biased into blocking relation with the path of movement of said coupling means; and wherein said flash operation control means includes a member movable from a first position, in which it holds said flash coupling lever out of said path when said flash lamp element is in its first said position, to a second position in which it releases said flash coupling lever into said blocking relation when said flash lamp element is moved to its operative position.

7. A camera according to claim 6 wherein said flash control member also moves said shutter control member to cause the speed of said shutter to be adjusted to a predetermined value when said flash control member is moved to said second position.

References Cited by the Examiner
UNITED STATES PATENTS

| | | | |
|---|---|---|---|
| 2,967,469 | 1/61 | Lachaize | 95—11 |
| 3,051,066 | 8/62 | Lareau | 95—15 |
| 3,121,379 | 2/64 | Macomber | 95—64 |

NORTON ANSHER, *Primary Examiner.*

JOHN M. HORAN *Examiner.*